United States Patent
Patent No.: 7826
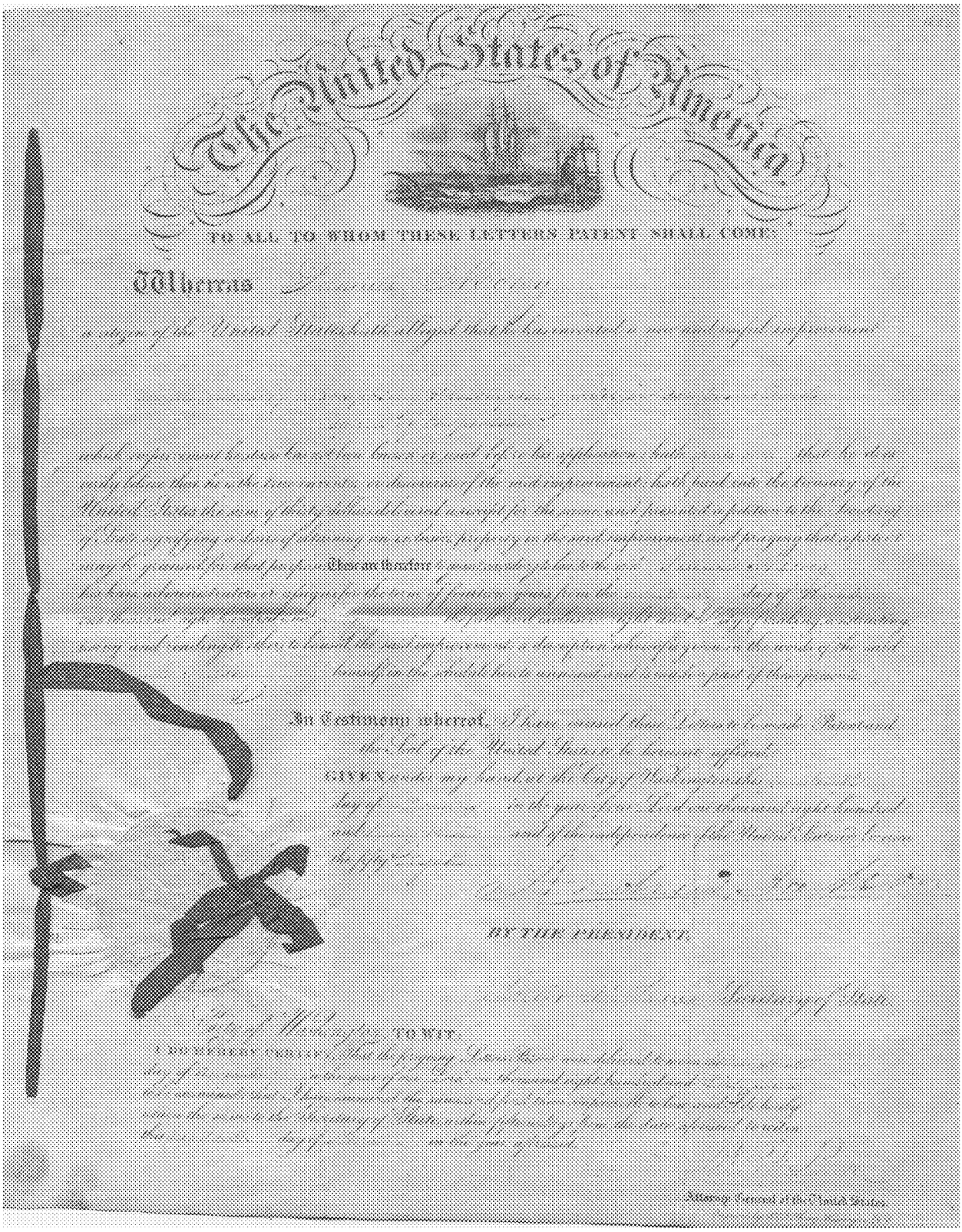
The United States of America
TO ALL TO WHOM THESE LETTERS PATENT SHALL COME:
Whereas
In Testimony whereof,
GIVEN under my hand at the City of Washington
BY THE PRESIDENT:
Secretary of State.
Attorney General of the United States.

United States Patent

Patent No.: 7826

United States Patent

Patent No.: 7826

United States Patent

Patent No.: 7826

United States Patent

Patent No.: 7826